United States Patent [19]

Mentler

[11] 4,089,033

[45] May 9, 1978

[54] HIGH SPEED BUS DIFFERENTIAL RELAY

[75] Inventor: Sandor Mentler, Downingtown, Pa.

[73] Assignee: General Electric Company, Philadelphia, Pa.

[21] Appl. No.: 774,551

[22] Filed: Mar. 4, 1977

[51] Int. Cl.² ............................................. H02H 3/28
[52] U.S. Cl. ........................................ 361/110; 361/63; 361/94
[58] Field of Search ......................... 361/110, 63–65, 361/67, 44, 45, 93, 94, 187, 197; 323/22 Z; 307/318

[56] References Cited

U.S. PATENT DOCUMENTS

| | | | |
|---|---|---|---|
| 2,548,625 | 4/1951 | Seeley | 361/63 |
| 3,259,802 | 7/1966 | Steen | 361/63 X |
| 4,025,821 | 5/1977 | Lang | 361/93 X |

Primary Examiner—Patrick R. Salce
Attorney, Agent, or Firm—William Freedman; Carl L. Silverman

[57] ABSTRACT

This high-speed differential protective arrangement discriminates between a fault occurring in a differentially-protected zone of a power circuit and operation of a lightning arrestor connected to the power circuit in said zone. The protective arrangement comprises a relay which operates in response to such a fault but which remains inactive despite operation of the lightning arrestor. Despite this insensitivity to lightning-arrestor operations, the relay is still able to operate relatively fast at levels of fault-produced voltage across input terminals to the protective arrangement much lower than those developed across these terminals by lightning-arrestor follow-through current.

5 Claims, 1 Drawing Figure

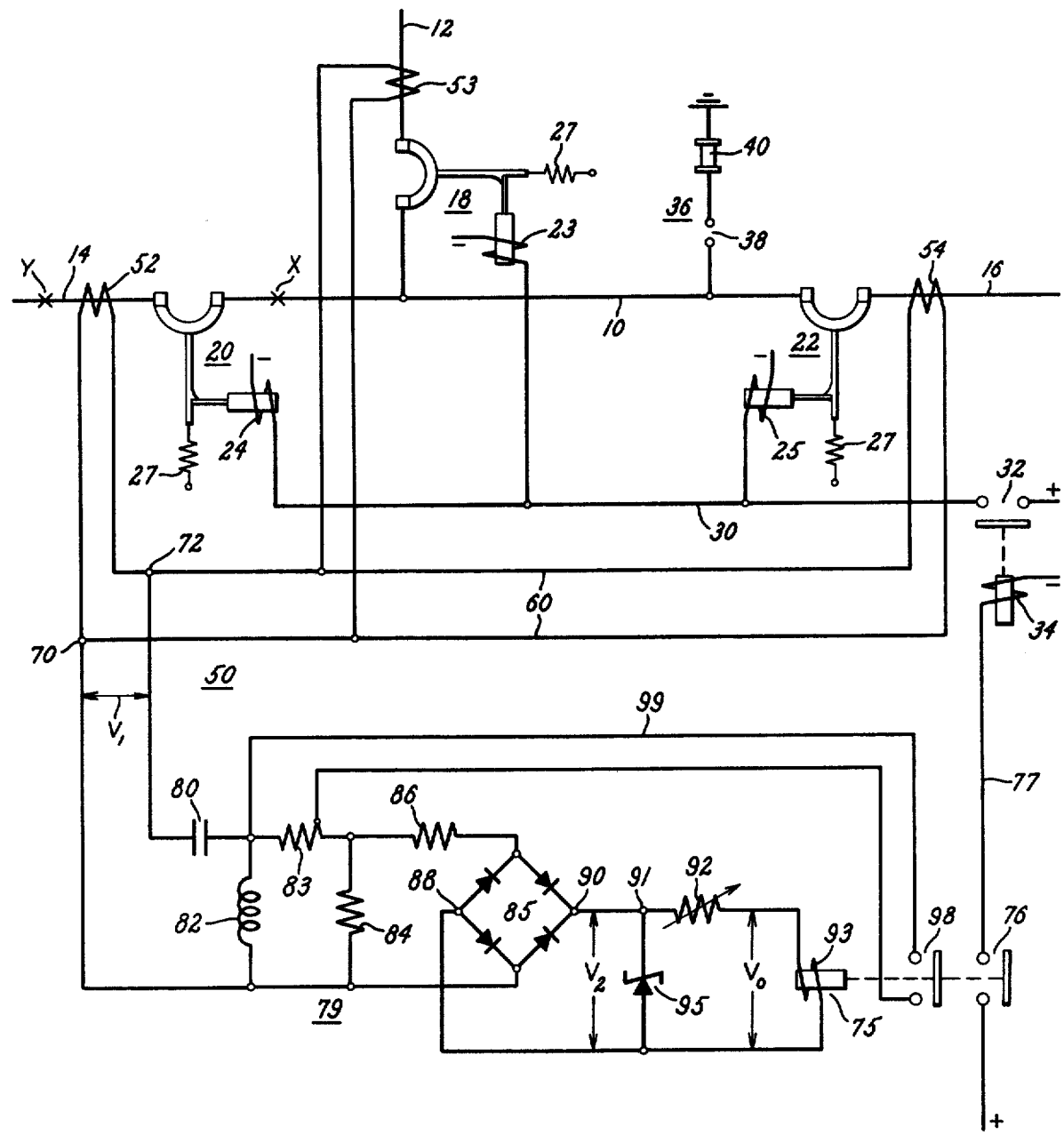

HIGH SPEED BUS DIFFERENTIAL RELAY

BACKGROUND

This invention relates to a high-speed differential protective arrangement for an electric power circuit and, more particularly, to a differential protective arrangement of this type for protecting said power circuit from faults internal to a predetermined zone of the power circuit.

The usual differential protective arrangement can discriminate between faults internal to a predetermined zone of the power circuit and those external thereto. But a problem that has been encountered when utilizing such a differential protective arrangement is that if a lightning arrestor is connected to the power circuit in said predetermined zone, the protective arrangement has difficulty discriminating between operation of the lightning arrestor and a true internal fault. More specifically, when such a lightning arrestor sparks over, initial spark-over is followed by follow-through current from the power circuit, and this follow-through current appears to the protective arrangement as internal fault current.

Despite this appearance, however, the protective arrangement should not operate in response to normal follow-through current since the lightning arrestor itself will interrupt such current within a short period, typically one-half cycle or less of power frequency current. One way to prevent the relay of the differential protective arrangement from operating in response to these conditions is to use a relatively slow relay, i.e., a relay which has a pick-up time sufficiently great so that it does not have time to pick up in response to lightning-arrestor current of the magnitude of follow-through current flowing for the normal duration of follow-through current.

A problem that has been present with this latter approach is that for lower magnitude fault currents, the relatively slow relay of the preceding paragraph requires an excessive time for pick-up. As a specific example, if the relay has a pick-up time of 1.5 cycles at 10 times pick-up voltage applied across input terminals to the relay, its pick-up time at 1.5 times pick-up voltage across these terminals will be about 3 cycles. Such long operating times cannot be tolerated in a high speed differential protective arrangement.

SUMMARY

An object of my invention is to provide a high-speed differential protective arrangement comprising a protective relay that is able to remain inactive despite operation of a lightning arrestor in the differentially-protected zone of the power circuit but yet is still relatively fast at voltage levels across input terminals to the protective arrangement much lower than those developed across said terminals by lightning arrestor follow-through current.

In carrying out the invention in one form, I provide a differential protective arrangement for protecting a power circuit from faults internal to a predetermined zone of the circuit. The power circuit has connected thereto in said zone a lightning arrestor which is adapted to spark over in response to overvoltage and to thereafter allow follow-through current to flow therethrough typically for times equal to or less than a predetermined maximum period. The protective arrangement comprises means for developing a first voltage varying directly with the vector sum of the currents flowing into and out of said zone of the power circuit. A filter energized by said first voltage is used to develop a second voltage generally free from any aperiodic component of said first voltage. This second voltage is applied to input terminals of rectifying means having output terminals across which there is developed a unidirectional third voltage varying directly in magnitude with said second voltage. A relay is provided having an operating element connected across the output terminals of the rectifying means for energization by said third voltage. A zener diode is also connected across said output terminal and in parallel with the relay operating element.

The relay is operated when the voltage $V_O$ developed by said third voltage across said operating element is equal to or greater than a predetermined minimum pick-up level $V_{p.u.}$ but remains inactive at lower values of $V_O$. The zener diode has a zener voltage slightly higher than a value of voltage applied thereto that results in a voltage $V_O$ equal to said predetermined minimum pick-up level being applied to said operating element. Said zener voltage is sufficiently low that during lightning arrestor follow-through current the voltage across said zener diode substantially equals said zener voltage. The relay has a sufficiently long pick-up time to prevent relay operation in response to lightning arrestor operations that result in follow-through current persisting for times equal to said predetermined maximum periods.

BRIEF DESCRIPTION OF DRAWING

For a better understanding of the invention, reference may be had to the accompanying drawing wherein the single FIGURE is a schematic diagram of a differential protective arrangement embodying one form of the invention being used for protecting a power circuit.

DETAILED DESCRIPTION OF PREFERRED EMBODIMENT

Referring now to the drawing, there is shown a power circuit comprising a bus 10, a source line 12, and feeder lines 14 and 16. The source line 12 is connected to the bus through a circuit breaker 18, and the feeder lines 14 and 16 are connected to the bus through circuit breakers 20 and 22, respectively. Circuit breakers 18, 20, and 22 are provided with trip coils 23, 24 and 25, respectively. When one of these trip coils is energized, it releases its associated trip latch, which allows the associated circuit breaker to trip open under the influence of its opening spring 27.

The trip coils 23, 24 and 25 are connected in parallel with each other in a trip circuit 30 that includes the normally-open contacts 32 of an auxiliary tripping relay 34 in series with the trip coils. When the auxiliary relay 34 is operated, it closes its contacts 32 and completes the trip circuit 30 to energize the trip coils and thus open the circuit breakers.

Power systems such as illustrated are often provided with a lightning arrestor to protect the system from over-voltages that might be caused by lightning and switching surges. Such an arrestor is schematically shown at 36 connected between bus 10 and ground. The illustrated arrestor is a conventional one comprising the series combination of a spark gap 38 and a current-limiting resistor 40, preferably having non-linear resistivity properties. Such resistors are typically of silicon carbide, such as that sold by General Electric Company under the trademark Thyrite. If a severe voltage surge should appear on the bus 10, the gap 38 will spark over when the bus-to-ground voltage rises to a predetermined level, thus dissipating the surge through the arrestor before an excessive voltage can be developed. Power current flows through the arrestor following initial spark-over of the gap, but this follow-through current is limited by the non-linear resistor 40. Typically, after about ½ cycle (of power frequency current), the follow-through current will be interrupted by the gap 38, restoring the power circuit to normal operation. Further reference will be made hereinafter to lightning arrestor operation.

For protecting the power circuit 10-16 against damage from faults occurring on the bus 10, a differential protective arrangement 50 is provided. This differential protective arrangement comprises a plurality of current transformer secondary windings 52, 52, and 54 connected, effectively in parallel, in a conventional differential circuit 60. The portion of the power circuit located between windings 52, 53 and 54 is referred to as the protected zone of the power circuit, and any fault occurring within this zone between the power circuit and ground is referred to as an internal fault.

Generally speaking, so long as the vector sum of the currents flowing into and out of the protected zone of the power circuit is equal to zero, no voltage is developed across the terminals 70 and 72 of the differential circuit. But if an internal fault should develop, e.g., at point X, this sum is no longer equal to zero, and a voltage is developed across terminals 70 and 72 varying directly with the magnitude of the fault current. This voltage across terminals 70, 72 is utilized for operating a protective relay 75, which may be a conventional telephone-type relay having a set of normally-open contacts 76 connected in an auxiliary trip-controlling circuit 77. When the protective relay 75 is operated to close its contacts, auxiliary trip circuit 77 is completed. This operates auxiliary relay 34, which effects tripping of the three circuit breakers 18, 20, and 22, thereby isolating the faulted bus 10 from the remainder of the power system.

For utilizing the voltage across terminals 70 and 72 to operate relay 75, I provide a control circuit 79 that includes a high-pass filter comprising the series combination of an input capacitor 80 and an inductance 82 connected across terminals 70 and 72. Connected across the inductance 82 is the series combination of two resistors 83 and 84 acting as a voltage divider. The control circuit 79 further comprises a rectifying bridge 85 having its input terminals connected across resistor 84 through another resistor 86. Across the output terminals 88 and 90 of the rectifying bridge, I connect the series combination of an adjustable resistor 92 and the operating coil 93 of relay 75. Also connected across the terminals 88 and 90 and in parallel with the series combination 92, 93, I provide a zener diode 95, which serves an important purpose, soon to be described in detail.

The voltage $V_1$ developed across input terminals 70 and 72 in response to a fault or ground in the protected zone will be an alternating voltage, and the voltage $V_2$ developed across the output terminals 88, 90 of rectifier 85 will be a unidirectional voltage. For relatively low voltages $V_1$, the unidirectional voltage $V_2$ developed across the output terminals 88 and 90 of the rectifier will be substantially proportional to $V_1$. This unidirectional voltage $V_2$ is applied to the series combination of adjustable resistor 92 and relay coil 93 and will pick up the relay if the resulting voltage $V_0$ across the relay coil 93 is above a predetermined minimum pick-up level $V_{p.u.}$.

If $V_2$ reaches a predetermined level, the zener diode 95 will immediately and effectively break over, allowing sufficient current therethrough to prevent a further rise in the voltage $V_2$. This predetermined voltage level is referred to herein as the zener voltage. Thus, for voltages $V_1$ which result in voltages $V_2$ below the zener voltage of the zener diode 95, voltage $V_2$ is substantially proportional to $V_1$; but for voltages $V_1$ at any higher level, the resulting voltage $V_2$ remains substantially equal to the zener voltage (considered on an instantaneous basis).

The zener diode 95 is chosen so that its zener voltage is slightly higher than a value of $V_2$ that results in a voltage $V_0$ equal to the minimum pick-up level $V_{p.u.}$ of the relay 75. Thus, the relay 75 will pick up at voltages $V_2$ slightly below the zener voltage.

As a result of the relationship described in the two immediately-preceding paragraphs, the relay will pick up at the higher values of $V_1$ in a time that is only slightly less than the time required for pick up when $V_1$ produces a voltage $V_0$ equal to the minimum pick-up voltage $V_{p.u.}$. Without the zener diode, the pick-up time at the higher values of $V_1$ would be much less than that produced when $V_1$ is at a level producing minimum pick-up voltage $V_{p.u.}$. For example, in a typical control circuit such as shown but without the zener diode 95, the pick-up time when $V_1$ is at 10 times that required for pick-up is about 0.5 times that at 1.5 times pick-up. But with the zener diode present, this ratio is over 0.7.

Operation of the lightning arrestor 36 produces follow-through currents that result in voltages $V_1$ much higher than required to pick-up relay 75. For example, these voltages $V_1$ can be as high as 10 times that required to produce relay pick-up. The lightning arrestor itself typically clears this follow-through current within one-half cycle following initial spark-over. So it is not necessary to open the circuit breakers 18, 20, 22 to interrupt this current, and hence the relay 75 should not operate in response to such follow-through current. I am able to prevent the relay from picking up in response to such follow-through current: (1) by providing the zener diode 95, which limits $V_2$ under lightning-arrestor follow-through current conditions to a predetermined zener voltage and (2) by providing a relay that has a pick-up time sufficiently long so that it does not have time to operate in response to the voltage $V_2$ produced by lightning arrestor follow-through current being applied for the typical period that follow-through current flows, e.g., one-half cycle.

The pick-up time should be sufficiently short to provide for quick operation of the relay if current of this magnitude flows for a greater period than one-half cycle; but in order to provide a margin of safety to assure against false operation and to allow for electrical constants and mechanical inertia, the relay must have a pick-up time appreciably above one-half cycle under follow-through current conditions. A typical value is about 1 to 1 ½ cycles of power frequency current when the operating element 93 is energized by the value of $V_0$ that is present when $V_1$ is 5 times the value of $V_1$ required to produce a voltage $V_0$ equal to the minimum pick-up voltage $V_{p.u.}$.

Assuming that the relay has a pick-up time such as described in the immediately-preceding paragraph, if the zener diode was not present, then for lower values of $V_1$ (such as 1.5 or 2 times the value required for relay pick-up) an excessive amount of time would be needed to effect relay pick-up (for example, about two times that required for the higher values of $V_1$ produced by lightning-arrestor follow-through current). However, by including zener diode 95, and specifically a zener diode which limits the value of $V_2$ developed during lightning-arrestor follow-through currents to substantially the zener voltage, I am able to very substantially reduce this ratio, e.g., down to about 1.38. Accordingly, I can provide a relay that has a long enough pick-up time to remain inactive in response to typical lightning arrestor follow-through currents and yet is able to respond without excessive delay to much lower currents such as those producing a voltage $V_1$ of only 1.5 times that required for relay pick-up.

For a given value of $V_1$ applied prior to breakdown of the zener diode 95, it is desirable that $V_2$ under steady state conditions be generally equal to $V_2$ under transient conditions such as those occurring during a high current fault. To achieve this effect, the resistance of resistor 92 should be as high as possible. In a typical embodiment resistor 92 has a resistance of 1500 ohms, the relay coil 93 has a resistance of 400 ohms, and resistor 86 has a resistance of 53 ohms.

The level of voltage $V_1$ required to pick-up relay 75 can be changed by adjusting the value of adjustable resistor 92. Such adjustments are used for calibration purposes to effect minor changes in the pick-up level of the relay. To effect major changes in the level of $V_1$ required for pick up, adjustments are made in the value of resistance 84, which for such purposes may be a rheostat. The advantage of effecting major changes in pick-up voltage by relying upon adjustments of resistor 84 instead of resistor 92 is that such approach allows the L/R time constant for circuit 92, 93 to be maintained substantially constant at the desired low value. While such changes in resistor 84 do not change the Q of the filter 80, 82, these changes in Q are small and essentially negligible.

The maximum total resistance of resistors 86 and 92 is determined by the minimum current required for relay pick-up. As pointed out hereinabove, it is desirable to maximize the resistance of resistor 92. This results in utilizing a resistor 86 having a relatively low resistance compared to that of resistor 92.

The purpose of resistor 86 is to limit the power dissipation in the zener diode when it breaks over at high levels of input voltage $V_1$. Although resistor 86 is shown on the input side of rectifier 85, it could equally well be located on the output side, e.g., between terminal 90 and junction point 91. In either case, the resistor 86 can be considered to be effectively connected in series with the zener diode 95, considered with respect to energization by the voltage $V_1$ or the voltage appearing across filter element 82.

In this typical embodiment referred to hereinabove, the zener diode has a zener voltage of 27 volts. Capacitor 80 has a capacitance of about 1.5 microfarads, inductance 82 has an inductance of about 8 henries, and resistors 83 and 84 resistances of about 2000 and 130 ohms, respectively.

The purpose of the high-pass filter 80, 82 is to filter out the aperiodic component from the total signal applied to the input terminals 70 and 72 during faults external to the protected zone of the power circuit, thus reducing the chance of relay operation in response to such faults, which operation is not desired. Such an external fault is schematically shown at Y. As the bulk of the energy contained in the aperiodic component is contained in a frequency band extending from zero to well below power frequency (60 Hz), it is only necessary to attenuate frequencies well below 60 Hz, e.g., below 40 Hz. This the high-pass filter can do quite effectively.

A high-pass filter in this circuit location has a number of significant advantages over a comparable band-pass filter (e.g., one having equal attenuation at an appropriate low frequency (e.g., 25 Hz.) and no attenuation at 60 Hz.). One such advantage is that the high-pass filter has a significantly lower Q, thus having a lower delay which contributes to faster delay operations. Another is that the high-pass filter provides higher attenuation of low frequencies. Still another is that the high pass filter does not attenuate the harmonics of 60 Hz., as does the band-pass filter, thus allowing much more of the input energy to the filter to pass through to the relay, thus allowing less efficient (and thus less expensive) current transformers 52, 53, 54 to be used.

For providing a dynamic seal-in for the relay 75 which causes the relay, once it is initially picked up, to remain picked up until the voltage $V_1$ falls to some level much lower than that required for initial pick-up, I provide the relay with a set of normally-open seal-in contacts 98 connected in a shunt circuit 99 around a portion of the resistor 83. Pick-up of the relay closes the seal-in contacts 98, completing the shunt circuit 99. This results in a greater percentage of the voltage $V_1$ being applied to the input terminals of rectifier 85, thus enabling relay 93 to remain picked up even though $V_1$ decays to a lower value than that required for initial pick-up.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the U.S. is:

1. In a high-speed differential protective arrangement for protecting a power circuit from faults internal to a predetermined zone of the power circuit, said power circuit having connected thereto in said zone a lightning arrestor which is adapted to spark over in response to an overvoltage and to thereafter allow follow-through current to flow therethrough typically for times equal to or less than a predetermined maximum period,
 (a) means for developing a first voltage varying directly with the vector sum of the currents flowing into and out of said zone,
 (b) a filter energized by said first voltage and developing a second voltage generally free from any aperiodic component of said first voltage,
 (c) rectifying means energized by said second voltage and having output terminals across which a unidirectional third voltage varying directly in magnitude with said second voltage is developed,
 (d) a relay having an operating element connected across the output terminals of said rectifying means for energization by said third voltage,
 (e) a zener diode connected across the output terminals of said rectifying means in parallel with said relay operating element,
 (f) said relay being operable when the voltage $V_0$ developed by said third voltage across said operating element is equal to or greater than a predetermined minimum pick-up level $V_{p.u.}$ but remaining inactive at lower values of $V_0$, (g) said zener diode having a zener voltage slightly higher than a value of voltage applied thereto that results in a voltage $V_0$ equal to said predetermined minimum pick-up level being applied to said operating element, (h) said zener voltage being sufficiently low that during lightning arrestor follow-through current the voltage developed across said zener diode substantially equals said zener voltage, and (i) said relay having a sufficiently long pick-up time to prevent relay operation in response to lightning arrestor operations that result in follow-through currents persisting for times equal to said predetermined maximum period.

2. The differential protective arrangement of claim 1 in which:

(a) a first resistor is provided connected in series with said relay operating element across said zener diode, (b) a second resistor is provided effectively connected in series with said zener diode and said first resistor for energization by said second voltage and effectively limiting the power dissipation in said zener diode upon break-over thereof, and (c) said first resistor has a high value of resistance compared to that of said second resistor.

3. The protective arrangement of claim 1 in which, considered on an instantaneous basis,:

(a) said third voltage varies in magnitude directly with said first voltage so long as said third voltage is insufficient to cause break-over of said zener diode, and (b) said third voltage remains substantially constant after break-over of said zener diode despite increases in said first voltage beyond a value producing break-over of said zener diode.

4. The protective arrangement of claim 1 in which a resistor is connected in series with the parallel combination of said zener diode and said operating element, considered with respect to energization by said second voltage.

5. The protective arrangement of claim 1 in which said relay has a pick-up time of about 1 to 1 ½ cycles of power frequency current when said operating element is energized by the value of $V_0$ that is present when said first voltage ($V_1$) is 5 times the value of $V_1$ required to produce $V_{p.u.}$.

* * * * *